United States Patent [19]

Usui

[11] Patent Number: 4,932,619
[45] Date of Patent: Jun. 12, 1990

[54] CLAMP DEVICE FOR FIXING SMALL-DIAMETER PIPE

[75] Inventor: Masayoshi Usui, Numazu, Japan

[73] Assignee: Usui Kokusai Sangyo Kaisha Ltd., Shizuoka, Japan

[21] Appl. No.: 315,391

[22] Filed: Feb. 24, 1989

[30] Foreign Application Priority Data

Mar. 11, 1988 [JP] Japan .................. 63-32374

[51] Int. Cl.$^5$ .............................. F16L 3/08
[52] U.S. Cl. ...................... 248/74.1; 248/62
[58] Field of Search ............ 248/74.1, 74.5, 316.1, 248/231, 68.1, 62, 74.3; 24/16 PB, 20 R, 457, 458, 483, 484, 542

[56] References Cited

U.S. PATENT DOCUMENTS

| | | | |
|---|---|---|---|
| 1,769,573 | 7/1930 | Gwinn | 248/74.1 X |
| 4,533,102 | 8/1985 | Ferrell | 248/316.1 |
| 4,535,960 | 8/1985 | Downing | 248/74.5 |
| 4,588,152 | 5/1986 | Ruehl | 248/74.5 X |
| 4,790,502 | 12/1988 | Saegusa | 24/20 R |
| 4,801,115 | 1/1989 | Heard | 248/231 |

Primary Examiner—J. Franklin Foss
Attorney, Agent, or Firm—Anthony J. Casella; Gerald E. Hespos

[57] ABSTRACT

A clamp device for fixing a small-diameter pipe comprises a clamp body which is formed of a flexible strip and includes a holding wall formed by bending one side thereof in its longitudinal direction into a substantially U-shape and whose other end side is formed as an installation wall for installation onto a base; and a pipe for being held by the holding wall of the clamp body. The clamp body is provided with through-holes in a root portion of the holding wall and a distal end portion thereof, respectively, by maintaining an interval therebetween and support walls formed by inwardly erecting side edge portions of the holding portion in the vicinity of the through-holes, the support walls being adapted to abut against an outer peripheral surface of the pipe, and a tightening member being adapted to be inserted through the through-holes for clamping.

7 Claims, 1 Drawing Sheet

CLAMP DEVICE FOR FIXING SMALL-DIAMETER PIPE

BACKGROUND OF THE INVENTION

1. Field of the Invention:

The present invention relates to a clamp device for fixing a metal pipe or a resin tube (hereafter simply referred to as the pipe) having a relatively small diameter of about 30 mm or less, the pipe being generally provided as a supply passage for supplying oil, a gas, or the like in an automobile, or various types of machine and equipment.

2. Description of the Related Art:

Conventionally, clamp devices having various configurations are known as clamp devices of this type. For instance, as shown in FIG. 4, one conventional clamp device is arranged such that a holding wall 12 curved in the form of a cutaway circle on one side thereof in its longitudinal direction is formed extending from a flat installation wall having a bolt hole 13 for installation onto a base so as to form a clamp body 11, and a pipe P' is clamped by the holding wall 12 to fix the pipe P'. In addition, as shown in FIG. 5, another conventional clamp device is arranged such that a clamp wall 22 curved in the form of a circle on one side thereof is formed extending from an installation wall having a bolt hole 23 for installation onto a base so as to form a clamp body 21, a distal end portion of the holding wall 22 bent in the form of L is brought into contact with the installation wall in a state in which a pipe P" is installed via a cushioning material 24 such as resin or rubber at the time of fixing the pipe P", and the pipe P" is secured by being tightened with a bolt 25.

With the above-described prior art, however, in the former case, the loosening of the clamp device can occur due to the springing back of the securing means clamping the pipe P' after installation thereof. Subsequently, at the time of transport or handling of products using the vehicle or machine with the pipe mounted thereon, the shifting of the position of the pipe P' or scratching of the pipe P' can occur due to vibrations imparted from the engine or the machine, thereby making the fixing insecure. In the latter case, loosening generally tends to occur in the fixing since the pipe P" is tightened with the bolt 25 at a position which is remote from the circularly curved holding wall because of the structure of the distal end portion of the holding wall 22 bent in the form of L and abutting against the installation wall. Furthermore, there is a problem in that the deviation of the position of the pipe P" can, over a period of time, occur due to the deterioration of the interposed cushioning material 24.

SUMMARY OF THE INVENTION

Accordingly, an object of the present invention is to provide a clamp device for fixing a small-diameter pipe which is free of the loosening of the pipe even under vibration at the time of transport and handling after the pipe is fixed, and which is capable of positively fixing the pipe over extended periods of time and of preventing the shifting of the position of the pipe and the scratching thereof, thereby overcoming the above-described drawbacks of the conventional art.

To this end, in accordance with the present invention, there is provided a clamp device for fixing a small-diameter pipe, comprising: a clamp body which is formed of a flexible strip and includes a holding wall formed by bending one side thereof in its longitudinal direction into a substantially U-shape and whose other end side is formed as an installation wall for installation onto a base; and a pipe for being held by the holding wall of the clamp body. The clamp body is provided with through-holes in a root portion of the holding wall and a distal end portion thereof, respectively, by maintaining an interval therebetween and support walls formed by inwardly erecting side edge portions of the holding portion in the vicinity of the through-holes, the support walls being adapted to abut against an outer peripheral surface of the pipe, and a tightening member being adapted to be inserted through the through-holes for clamping.

Since the clamp device in accordance with the present invention is arranged as described above, the pipe can be held in close contact over the outer peripheral surface thereof with the entire surface of the holding surface with the pipe fixed by the flexible clamp. In addition, the clamp device is capable of positively securing the pipe by virtue of the resiliently forced support provided by the abutting of the support walls against the outer peripheral surface of the pipe by maintaining an interval between the vicinity of the root portion of the holding wall and the distal end portion thereof.

DETAILED DESCRIPTION OF THE PREFERRED EMBODIMENTS

Figure 1:
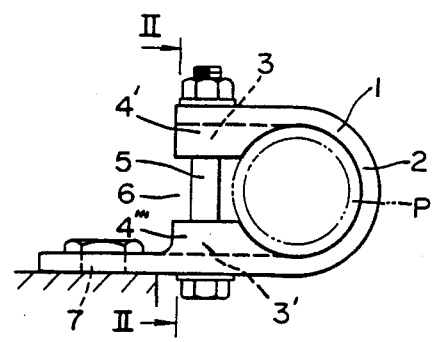
FIG. 1 is a side-elevational view of a clamp device for fixing a small-diameter pipe in accordance with an embodiment of the present invention.
Figure 2:
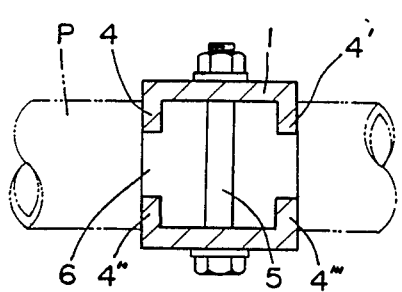
FIG. 2 is a cross-sectional view taken along the line II—II of FIG. 1.
Figure 3:
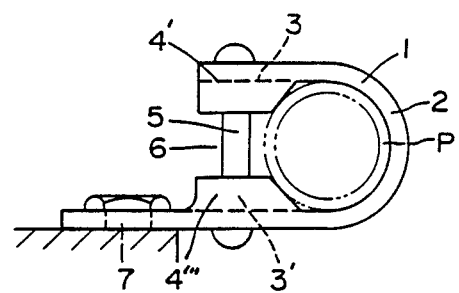
FIG. 3 is a view illustrating another embodiment and corresponding to FIG. 1.
Figure 4:
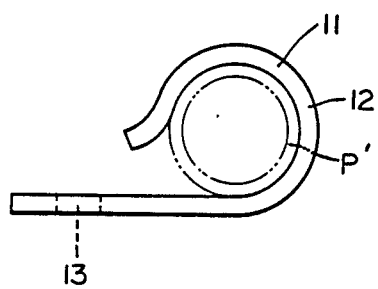
FIGS. 4 and 5 respectively show side-elevational views of conventional arts.
Figure 5:
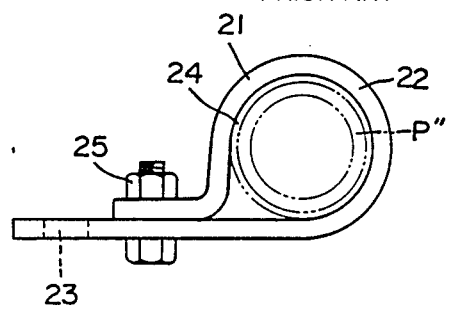

In FIGS. 1 to 3, a clamp body 1 is formed of a flexible strip made of a metallic material (including a resin-coated material) or a resinous material. This clamp body 1 is arranged such that a substantially U-shaped curved holding wall 2 for installing a pipe P, constituted by a metallic pipe or resinous tube, is formed on one side thereof in its longitudinal direction, while the other end side thereof is used as a flat installation wall for installation on a base (not shown) and is provided with a bolt hole 7. Throughholes 3, 3' are provided in the vicinity of a root portion of the curved holding wall 2 and in the vicinity of a distal end portion thereof in such a manner as to overlap with each other by maintaining a desired interval 6 therebetween when they are clamped. Furthermore, the side edge portions of the holding wall 2 in the vicinity of the through-holes are erected inwardly to form support walls 4, 4' and 4", 4'" for abutting against an outer peripheral surface of the pipe P. At the timing of tightening, the pipe P is clamped by this clamp device by means of a tightening member 5 such as a tightening bolt (see FIGS. 1 and 2) or a rivet (see FIG. 3) inserted through the through-holes 3, 3'.

Portions of the erected support walls 4, 4' and 4", 4'" that substantially come into contact with the pipe P are provided with a curvature corresponding to that of the peripheral surface of the pipe P, as shown in FIG. 1, or is provided with a linear, inclined surface, as shown in FIG. 3. In addition, it goes without saying that, to form the aforementioned U-shaped holding wall 2, since a flexible strip is used, the holding wall 2 that is in a developed state may be bent into a desired curved shape.

As described above, the clamp device for fixing a small-diameter pipe are arranged such that through-holes 3, 3' are provided in the vicinity of a root portion of the holding wall 2 and in the vicinity of a distal end portion thereof by maintaining an interval therebetween in a tightened state, the side edge portions of the holding wall 2 in the vicinity of the through-holes are erected to form the support walls 4, 4' and 4", 4''' for abutting against the pipe P, and the clamp device is tightened with the pipe P mounted therethrough, by means of the tightening member 5 inserted through the through-holes 3, 3'. Thus, the clamp device is capable of positively securing the pipe P by virtue of the holding of the pipe P with the entire surface of the holding wall 2 in close contact therewith as well as the forced support by the abutting of the support walls 4, 4', 4", 4''' against the outer peripheral surface of the pipe P by maintaining the interval 6 therebetween. Hence, this clamp device for fixing a small-diameter is capable of overcoming the problem of a shift in the position of the pipe P in the axial and circumferential directions thereof over a long period of time during transport and handling of products or in a vibrational state and is, at the same time, capable of preventing the occurrence of scratches in the pipe.

What is claimed is:

1. A clamp device for fixing a small-diameter pipe to a base, said clamp device comprising:
a clamp body unitarily formed from a flexible strip and including a generally planar installation wall having a bolt hole extending therethrough, a generally U-shaped holding wall defining a root portion extending unitarily from the installation wall and a distal end portion aligned generally parallel to the foot portion, said root portion and said distal end portion of said holding wall each being provided with through-holes extending therethrough, with the respective through-holes of the root portion and the distal end portion being substantially in register with one another, the through-hole in the root portion being in spaced relationship to the bolt hole through the installation wall, the root portion and the distal end portion of the holding wall each further including a pair of opposed generally parallel support walls extending generally parallel to one another and on opposite respective sides of the through-holes, each said support wall including linear edge portions inclined at an angle to the root portion for urging the pipe against portions of the holding wall intermediate the root portion and the distal end portion;
a tightening member extending through the through-holes in the root portion and the distal end portion of the holding wall for urging the root portion and the distal end portion toward one another such that the inclined edge portions of the support walls urge the pipe against the U-shaped holding wall; and
a bolt extending through the bolt hole of the installation wall for securely and selectively mounting the clamp device to the base.

2. A device according to claim 1, wherein said clamp is formed of a metal.

3. A device according to claim 1, wherein said pipe is constituted by a metal pipe.

4. A device according to claim 1, wherein said tightening member is a tightening bolt.

5. A device according to claim 1 wherein said clamp is formed of a resinous material.

6. A device according to claim 1 wherein said pipe is formed from a resinous material.

7. A device according to claim 1 wherein said tightening member is a rivet.

* * * * *